US010904342B2

(12) United States Patent
Tollet et al.

(10) Patent No.: US 10,904,342 B2
(45) Date of Patent: Jan. 26, 2021

(54) CONTAINER NETWORKING USING COMMUNICATION TUNNELS

(71) Applicant: Cisco Technology, Inc., San Jose, CA (US)

(72) Inventors: Jerome Tollet, Paris (FR); Giles Douglas Yorke Heron, London (GB); Keith Burns, San Jose, CA (US); Andre Jean-Marie Surcouf, St. Leu la Foret (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 16/049,401

(22) Filed: Jul. 30, 2018

(65) Prior Publication Data
US 2020/0036796 A1    Jan. 30, 2020

(51) Int. Cl.
*G06F 15/16* (2006.01)
*H04L 29/08* (2006.01)
(Continued)

(52) U.S. Cl.
CPC ............ *H04L 67/141* (2013.01); *G06F 9/547* (2013.01); *H04L 63/029* (2013.01)

(58) Field of Classification Search
CPC ...... H04L 67/141; H04L 63/029; G06F 9/547
See application file for complete search history.

(56) References Cited

U.S. PATENT DOCUMENTS 5,812,773 A    9/1998 Norin
5,825,772 A *  10/1998 Dobbins ............. H04L 12/1886
                                                              370/396
(Continued)

FOREIGN PATENT DOCUMENTS

CN    101719930    6/2010
CN    101394360    7/2011
(Continued)

OTHER PUBLICATIONS

Cask Data, Inc., Flows and Flowlets, 2014-2016, https://docs.cask.co/cdap/3.6.0/en/developers-manual/building-blocks/flows-flowlets/index.html. (Year: 2016).*
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
(Continued)

*Primary Examiner* — Moustafa M Meky
*Assistant Examiner* — Thorne E Waugh
(74) *Attorney, Agent, or Firm* — Polsinelli PC

(57) ABSTRACT

Systems, methods, and computer-readable media for enabling container networking are disclosed. In one aspect, a method includes receiving a request from a first network container on a source server to establish a data session with a second network container on a destination server; determining a destination switch of the destination server based on the request; identifying a communication tunnel between the source server and the destination server; generating a data stream to be embedded in the pre-established communication tunnel, wherein a communication protocol associated with the request is different from a communication protocol used by the data stream; receiving a data packet to be sent to the destination container; mapping the data packet to the data stream; and sending the data packet to the destination server via the data stream over the communication tunnel.

20 Claims, 6 Drawing Sheets

(51) Int. Cl.
*G06F 9/54* (2006.01)
*H04L 29/06* (2006.01)

(56) References Cited

U.S. PATENT DOCUMENTS

| | | |
|---|---|---|
| 5,889,896 A | 3/1999 | Meshinsky et al. |
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,606,929 B2 * | 10/2009 | Gbadegesin ............ H04L 29/06 709/227 |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B2 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 9,847,938 B2 | 12/2017 | Chanda et al. |
| 10,498,654 B2 * | 12/2019 | Shalev ............... H04L 43/0852 |
| 10,516,496 B2 * | 12/2019 | Kits van Heyningen ............ H04H 20/81 |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |

(56) References Cited

U.S. PATENT DOCUMENTS

| | | |
|---|---|---|
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192019 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |

(56) References Cited

U.S. PATENT DOCUMENTS

| | | |
|---|---|---|
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0233384 A1* | 8/2014 | Howard ............ H04W 28/0289 370/235 |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277355 A1 | 9/2016 | Shetty et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0093921 A1* | 3/2017 | Duan .................... H04L 45/306 |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0214550 A1* | 7/2017 | Kumar ................ H04L 67/1095 |
| 2017/0264663 A1 | 9/2017 | Bicket et al. |
| 2017/0339070 A1 | 11/2017 | Chang et al. |
| 2018/0143885 A1* | 5/2018 | Dong .................. G06F 11/1482 |

FOREIGN PATENT DOCUMENTS

| | | | |
|---|---|---|---|
| CN | 102164091 | 8/2011 | |
| CN | 104320342 | 1/2015 | |
| CN | 105740084 | 7/2016 | |
| EP | 2228719 | 9/2010 | |
| EP | 2439637 | 4/2012 | |
| EP | 2645253 | 11/2014 | |
| KR | 10-2015-0070676 | 5/2015 | |
| TW | M394537 | 12/2010 | |
| WO | WO-2004043014 A2 * | 5/2004 | ............ H04L 29/06 |
| WO | W0 2009/155574 | 12/2009 | |
| WO | WO 2010/030915 | 3/2010 | |
| WO | WO 2013/158707 | 10/2013 | |
| WO | 2016187168 A1 | 11/2016 | |
| WO | 2017053441 A1 | 3/2017 | |

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

(56) References Cited

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Ford, Bryan, et al., Peer-to-Peer Communication Across Network Address Translators, in USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

(56) References Cited

OTHER PUBLICATIONS

Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

* cited by examiner

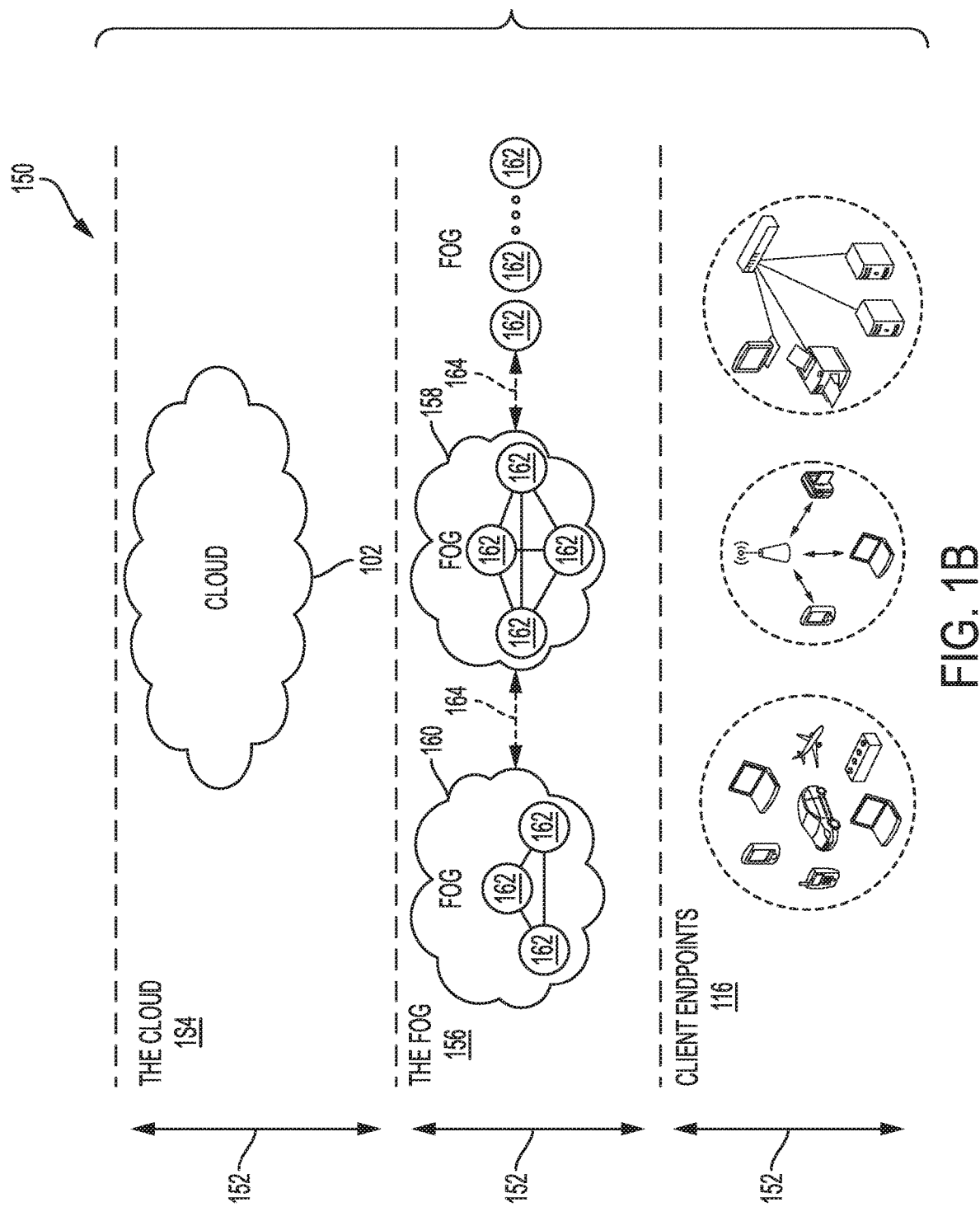

CONTAINER NETWORKING USING COMMUNICATION TUNNELS

TECHNICAL FIELD

The present technology pertains in general to interconnecting containers for micro-service based applications and more specifically to enabling traffic flow and data communication between network containers hosted on different physical hosts without performing a handshake process for establishing a communication channel therebetween.

BACKGROUND

With the introduction of microservices architecture into cloud computing, it is now common to see different services of an application distributed into different containers. For example, in a service chaining environment, it is common to see different service functions instantiated as different containers over one or more physical hosts/servers.

Traffic between such containers is usually carried with Secure Socket Layer (SSL)/Transport Layer Security (TSL) encoded traffic on top of Hyper Text Transfer Protocol (HTTP)1/2 layers. This transport requires a handshake process to be completed between containers, which consume a significant number of CPU cycles. Considering highly meshed applications and services, a number of requested and active Transport Control Protocol (TCP) connections between containers grows with a square of the number of containers (e.g., by (N(N−1)/2, with N being the number of containers).

Furthermore, in such highly meshed applications and with multiple micro-services implementing such applications, the number of active flows increases. This increase is problematic for some Network Fabric elements that cannot scale with the increase of number of flows such as Natural Address Translation (NAT), Load Balancing, Reflexive Access Lists (ACLs) elements. For example, there can be increased latency and CPU cycles used to setup connections between containers and there can be a large number of flows and states used for container networking in Network fabrics.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture, according to one aspect of the present disclosure;

DETAILED DESCRIPTION

Figure 1A:
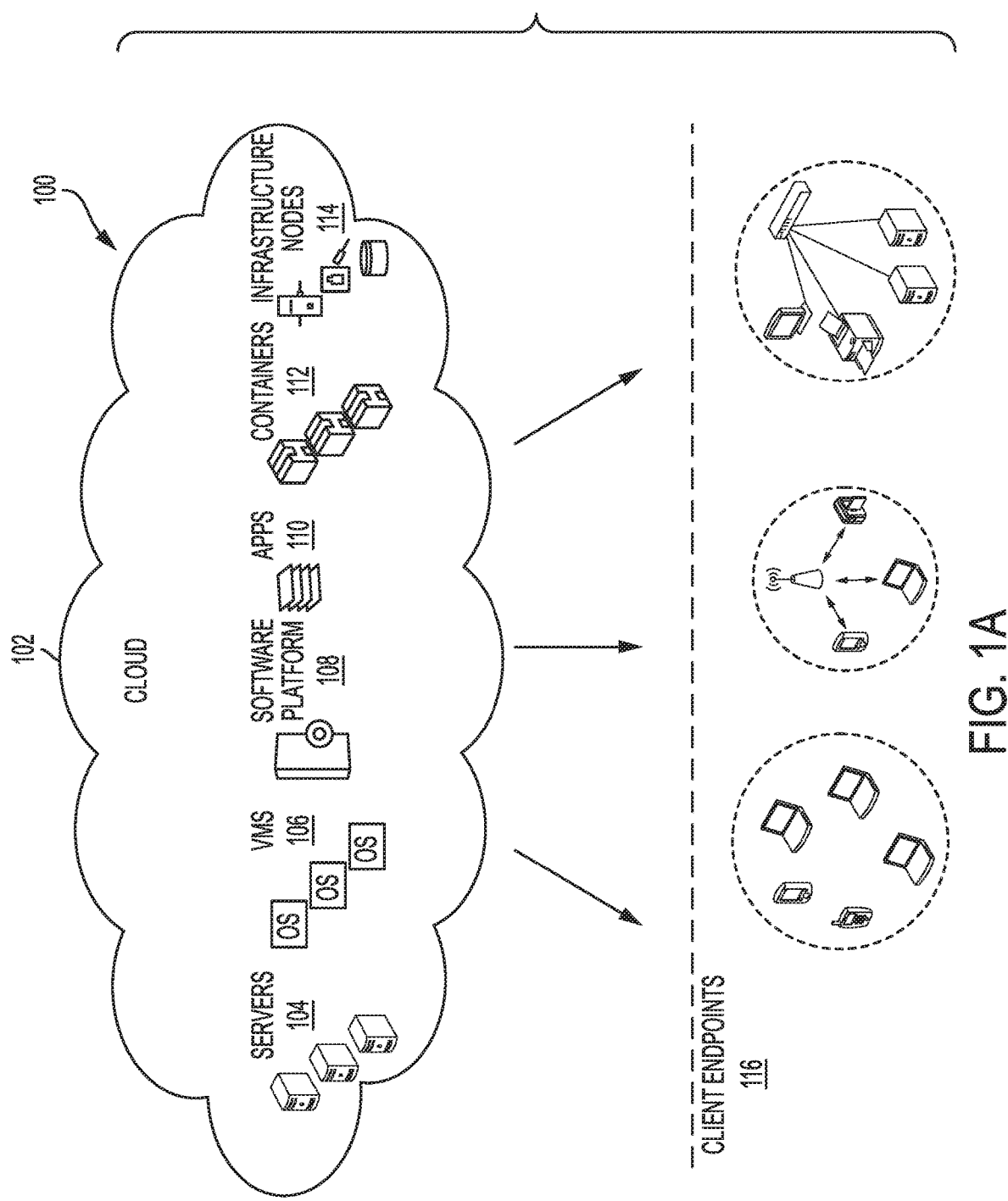
FIG. 1A illustrates an example cloud computing architecture, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As referenced herein, a Function Router can include a service that provides for registration and management of execution endpoints, FaaS services, functions, clients, locations, and routing rules on an account. The Function Router can receive requests for function execution from clients and dynamically route them to the 'best' endpoint to execute that function based on defined rules.

An Execution Endpoint (EE) can include a compute-capable system that can run functions. Non-limiting examples can include computers, laptops, IoT devices, servers, switches (e.g., virtual switches and routers (vswitches/vrouters), mobile phones, kiosks, workstations, etc. EEs can be registered in the Function Router for use in executing functions. Execution endpoints can run various FaaS run-time environments and services.

A client can include a device and/or application seeking to execute a function on an Execution Endpoint. Non-limiting examples of a client can include a robot arm, mobile phone, hand scanner, application, printer, kiosk, etc.

A function can include a piece of code. The piece of code can represent, for example, an ephemeral, self-contained set of business logic. Serverless functions can be compared to stored procedures in that they do a specific thing, and are called and executed when needed, only to go back to being dormant (but ready) when execution completes.

A location can include a physical location (e.g., a building, a floor, etc.) and/or a logical location. A location can be associated with specific latitude and longitude coordinates. For example, a location can refer to specific latitude and longitude coordinates corresponding to the manufacturing floor where a robot resides or a conference room where an FaaS device is plugged in, or a region associated with an environment.

Function routing rules can include policies and controls around who, what, when, where, why, and/or how for function execution. The rules can include IT-defined guardrails that affect the entire system, and other rules specified by IT or a development team for a specific function. Example rules can include: Function A can run on any endpoint but Function B must only run on a private endpoint; or Function A can be called by any client in a specific location, but function B can only be called by specific clients in any location.

Overview

Disclosed are systems, methods, and computer-readable media for enabling traffic flow and data communication between network containers hosted on different physical hosts without performing a handshake process for establishing a communication channel therebetween.

In one aspect of the present disclosure, a method includes receiving, at a source switch, a request from a first network container on a source server to establish a data session with a second network container on a destination server; determining, by the source switch, a destination switch of the destination server based on the request; identifying, by the source switch, a pre-established communication tunnel between the source server and the destination server; generating, by the source switch, a data stream to be embedded in the pre-established communication tunnel, wherein a communication protocol associated with the request is different from a communication protocol used by the data stream for communicating data between the first and second network containers; receiving a data packet, at the source switch, to be sent to the destination container; mapping, by the source switch, the data packet to the data stream; and sending, by the source switch, the data packet to the destination server via the data stream over the communication tunnel.

In one aspect of the present disclosure, a device includes one or more network containers implemented thereon and a network switch configured that is configured to receive a request from a first network container of the one or more network containers on the server to establish a data session with a second network container on a destination server; determine a destination switch of the destination network based on the request; identify a communication tunnel between the server and the destination server; generate a data stream to be embedded in the communication tunnel for exchange of data packets between the first network container and the second network container, wherein a communication protocol associated with the request received from the first network container is different from a communication protocol used by the data stream for facilitating the exchange of data packets between the first and second network containers; receive a data packet from the first network container to be sent to the destination container; map the data packet to the data stream; and send the data packet to the destination server via the data stream over the communication tunnel.

In one aspect of the present disclosure, one or more non-transitory computer-readable medium have computer-readable instructions stored thereon, which when executed by one or more processors, cause the one or more processors to function as a virtual switch of a server to receive a request from a first network container on the server to establish a transfer control protocol (TCP) session with a second network container on a destination server; determine a destination switch of the destination network based on the request; identify a communication tunnel between the server and the destination server; generate a data stream to be embedded in the communication tunnel for exchange of data packets between the first network container and the second network container, wherein a communication used by the data stream for facilitating the exchange of data packets between the first and second network containers is different from a TCP protocol used for the TCP session; receive a TCP data packet from the first network container to be sent to the destination container; map the TCP data packet to the data stream; and transmit the TCP data packet to the destination server via the data stream over the communication tunnel.

DETAILED DESCRIPTION

The disclosed technology addresses the need in the art for reducing latency and CPU cycles used to setup connections between network containers and the large number of flows and states used for container networking in Network fabrics.

Figure 2:
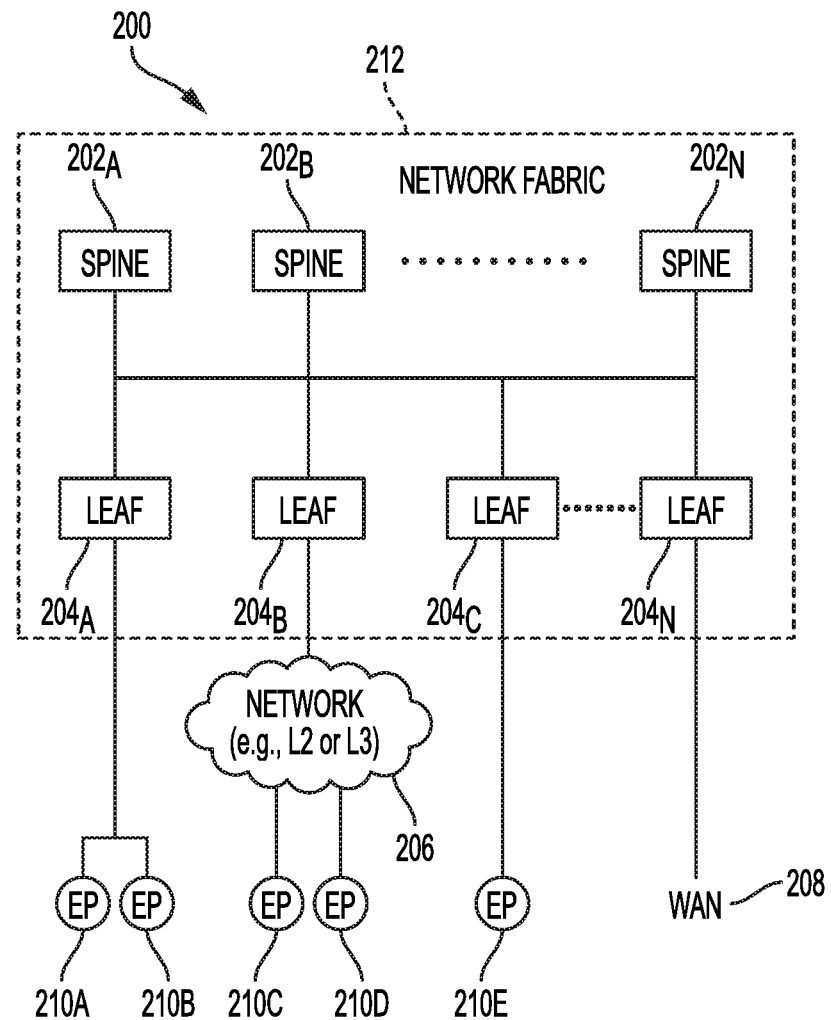
FIG. 2 illustrates a schematic diagram of an example network architecture, according to one aspect of the present disclosure.

The disclosure begins with a description of example network environments and architectures which can be implemented for serverless computing and service function chaining, as illustrated in FIGS. 1A, 1B, and 2, is first disclosed herein.

FIG. 1A illustrates an example cloud computing architecture, according to one aspect of the present disclosure. FIG. 1A illustrates a diagram of an example cloud computing architecture 100 or simply architecture 100. Architecture 100 can include a cloud 102. Cloud 102 can include one or more private clouds, public clouds, and/or hybrid clouds. Moreover, cloud 102 can include cloud elements 104-114. Cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

Cloud 102 can provide various cloud computing services via cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

Client endpoints 116 can connect with cloud 102 to obtain one or more specific services from cloud 102. Client endpoints 116 can communicate with elements 104-114 via one or more public networks (e.g., Internet), private networks, and/or hybrid networks (e.g., virtual private network). Client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates an example fog computing architecture, according to one aspect of the present disclosure. FIG. 1B illustrates a diagram of an example fog computing architecture 150. Fog computing architecture 150 can include cloud layer 154, which includes cloud 102 and any other cloud system or environment, and fog layer 156, which includes fog nodes 162. Client endpoints 116 can communicate with cloud layer 154 and/or fog layer 156. Architecture 150 can include one or more communication links 152 between cloud layer 154, fog layer 156, and client endpoints 116. Communications can flow up to cloud layer 154 and/or down to client endpoints 116.

Fog layer 156 or "the fog" provides the computation, storage and networking capabilities of traditional cloud networks, but closer to the endpoints. Fog 156 can thus extend cloud 102 to be closer to client endpoints 116. Fog nodes 162 can be the physical implementation of fog networks. Moreover, fog nodes 162 can provide local or regional services and/or connectivity to the client endpoints 116. As a result, traffic and/or data can be offloaded from cloud 102 to fog layer 156 (e.g., via fog nodes 162). Fog layer 156 can thus provide faster services and/or connectivity to client endpoints 116, with lower latency, as well as other advantages such as security benefits from keeping the data inside the local or regional network(s).

Fog nodes 162 can include any networked computing devices, such as servers, switches (e.g., vswitches/vrouters), routers, controllers, cameras, access points, kiosks, gateways, etc. Moreover, fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. Fog instances 158, 160 can be local or regional clouds or networks. For example, fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with cloud layer 154 and/or endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with cloud 154 while located at the starting location and switch to a different physical and/or logical connection point with cloud 154 while located at the destination location. The particular fog node can thus move within particular clouds and/or fog instances and, therefore, serve endpoints from different locations at different times.

FIG. 2 illustrates a schematic diagram of an example network architecture, according to one aspect of the present disclosure. FIG. 2 illustrates example network architecture 200. In some examples, the architecture 200 can include a data center, which can support and/or host cloud 102. Moreover, architecture 200 includes a network fabric 212 with spines 202A, 202B, . . . , 202N (collectively "202") connected to leafs 204A, 204B, 204C, . . . , 204N (collectively "204") in network fabric 212. Spines 202 and leafs 204 can be Layer 2 and/or Layer 3 devices, such as vswitches or vrouters. For the sake of clarity, they will be referenced herein as spine switches 202 and leaf switches 204.

Spine switches 202 can connect to leaf switches 204 in fabric 212. Leaf switches 204 can include access ports (or non-fabric ports) and fabric ports. Fabric ports can provide uplinks to spine switches 202, while access ports can provide connectivity for devices, hosts, endpoints, VMs, or external networks to fabric 212.

Leaf switches 204 can reside at the boundary between fabric 212 and the tenant or customer space. Leaf switches 204 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 204 can contain virtual switching and/or tunneling functionalities, such as a virtual tunnel endpoint (VTEP) function. Thus, leaf switches 204 can connect fabric 212 to an overlay (e.g., VXLAN network).

Network connectivity in fabric 212 can flow through leaf switches 204. Leaf switches 204 can provide servers, resources, endpoints, external networks, containers, or VMs access to fabric 212, and can connect leaf switches 204 to each other. Leaf switches 204 can connect applications and/or endpoint groups ("EPGs") to other resources inside or outside of fabric 212 as well as any external networks.

Endpoints 210A-E (collectively "210") can connect to fabric 212 via leaf switches 204. For example, endpoints 210A and 210B can connect directly to leaf switch 204A, which can connect endpoints 210A and 210B to fabric 212 and/or any other of leaf switches 204. Similarly, endpoint 210E can connect directly to leaf switch 204C, which can connect endpoint 210E to fabric 212 and/or any other of leaf switches 204. On the other hand, endpoints 210C and 210D can connect to leaf switch 204A and 204B via network 206. Moreover, wide area network (WAN) 208 can connect to leaf switches 204N.

Endpoints 210 can include any communication device or resource, such as a computer, a server, a cluster, a switch, a container, a VM, a virtual application, etc. In some cases, endpoints 210 can include a server or switch configured with a virtual tunnel endpoint functionality which connects an overlay network with fabric 212. For example, in some cases, endpoints 210 can represent hosts (e.g., servers) with virtual tunnel endpoint capabilities, and running virtual environments (e.g., hypervisor, virtual machine(s), containers, etc.). An overlay network associated with the endpoints 210 can host physical devices, such as servers; applications; EPGs; virtual segments; virtual workloads; etc. Likewise, endpoints 210 can also host virtual workloads and applications, which can connect with fabric 212 or any other device or network, including an external network.

Figure 3:
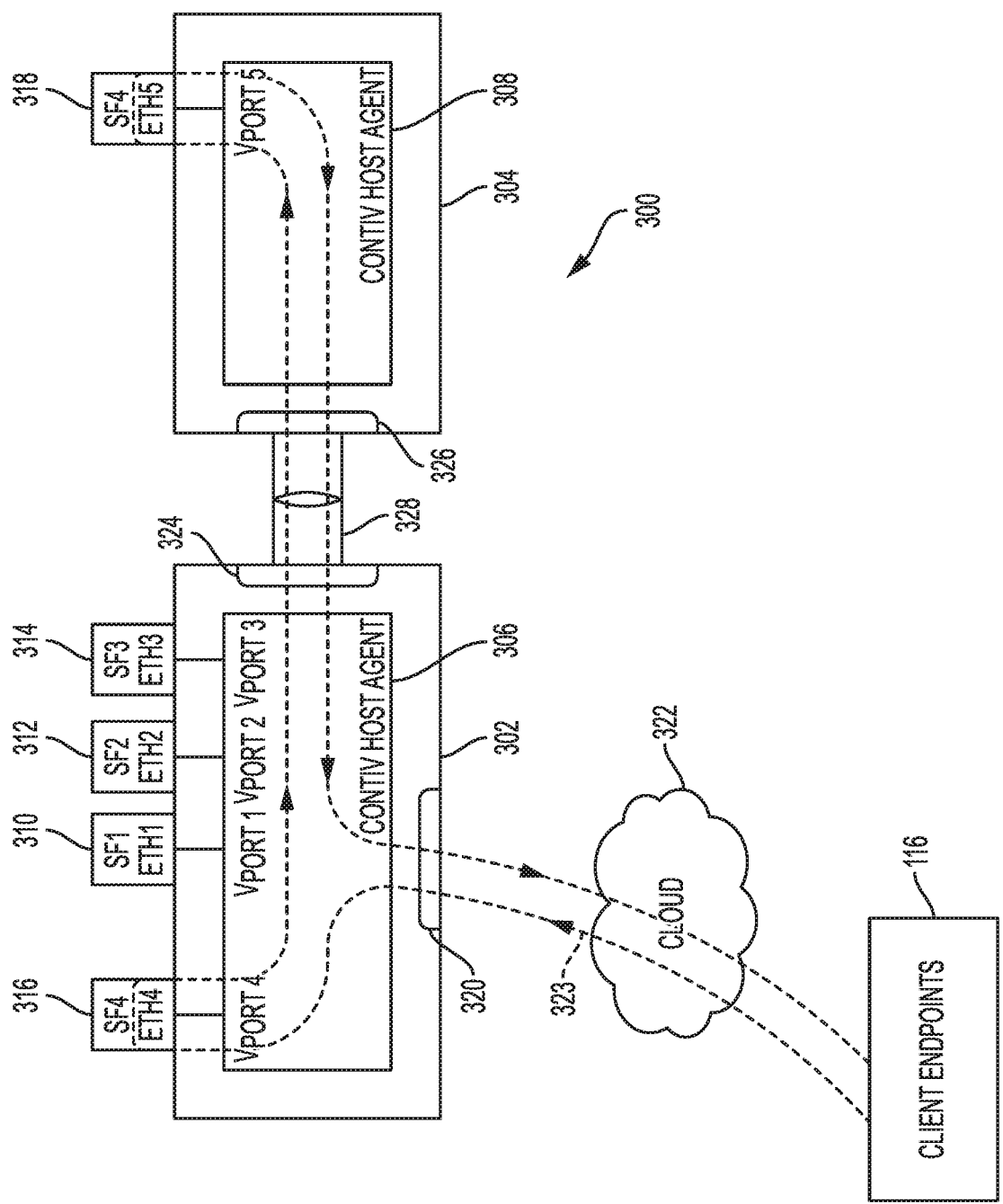
FIG. 3 illustrates an example structure of containers instantiated over two physical hosts, according to one aspect of the present disclosure.

FIG. 3 illustrates an example structure of containers instantiated over two physical hosts, according to one aspect of the present disclosure.

Environment 300 includes two physical hosts 302 and 304 (which can be the same as two of servers 104 shown in and described with reference to FIG. 1A). Each one of physical hosts 302 and 304 can have a Contiv HostAgent operating thereon such as Contiv HostAgents 306 and 308. Contiv HostAgents 306 and 308 can deliver policy-based management of various service functions deployed/instantiated as containers on a corresponding physical host.

Physical host 302 can have one or more containers (network containers) instantiated thereon such as containers 310, 312, 314 and/or 316. A container may also be referred to as a Point of Delivery (pod). For example, each container 310, 312, 314 can provide one service function (SF) such as one of SF1, SF2 or SF3 on physical host 302. Furthermore, physical host 302 can have a service function forwarder (SFF) 316, provided by a separate container running on physical host 302 or alternatively provided by one of containers 310, 312, 314 providing SF1, SF2 and/or SF3 that can direct data traffic and tasks to different containers depending on the specific function to be performed. Each of containers 310, 213, 314,316 can interface with Contiv HostAgent 306 via a virtual port thereof (i.e., one of ETH0-ETH4) and corresponding virtual ports of Contiv HostAgent 306 (i.e., one of Vport1-Vport4). Similarly, physical host 304 can have a SF4 running on container 318. Container 318 can also act as a SFF in a similar manner as SFF running on container 316. Container 318 can interface with Contiv HostAgent 308 via a virtual port thereof (i.e., ETH5) and corresponding virtual port of Contiv HostAgent 308 (i.e., Vport5).

Physical host 302 may have a physical port 320 through which data from client end points such as client endpoints 116 of FIG. 1A are received via cloud 322. For example, cloud 322 can be cloud 102 of FIG. 1A or fog 156 of FIG. 1B. Incoming data may be sent to container 316 (SFF) to be directed to one or more of containers 310, 312, 314 and/or 318 for servicing. An example data flow 323 through physical hosts 302/304 and containers 310, 312, 314, 316, 318 is shown in FIG. 3. However, inventive concepts are not limited thereto.

Furthermore, physical host 302 can have a switch 324 which may be a physical or virtual switch (vswitch) for establishing connection with other network components such as physical host 304 and container 318 running thereon. Similarly, physical host 304 can have a switch 326 which may be a physical or a virtual switch (vswitch) for establishing connection with other network components such as physical host 302 and containers 310, 312, 314, 316 running thereon.

In one example, SF1-SF4 provide a firewall service to one or more customers such as client endpoints 116 of FIG. 1A. Accordingly, in the example of FIG. 3, different service functions are instantiated as different ones of containers 310, 312, 314 and 318 on two different physical hosts, namely physical hosts 302 and 304. This distribution of service functions over different physical hosts can be due to, for example, high demand for particular service function being provided by a container on a given physical host and can be done for purposes of load balancing.

Accordingly, one of more of containers 310, 312, 314 on physical host 302 may attempt to establish a connection with container 318 on physical host 304. As briefly mentioned above, data traffic between such containers is usually carried via Secure Socket Layer (SSL)/Transport Layer Security (TSL) encoded traffic on top of Hyper Text Transfer Protocol (HTTP)1/2 layers. This transport requires a handshake process to be completed between containers, which consumes a significant number of CPU cycles. Considering highly meshed applications and services, a number of requested and active Transport Control Protocol (TCP) connections between containers grows with a square of the number of containers (e.g., by $(N(N-1)/2$, with N being the number of containers). Furthermore, in such highly meshed applications and multiple containers implementing such applications, the number of active flows increases. This increase is problematic for some Network Fabric elements that cannot scale with the increase of number of flows such as Natural Address Translation (NAT), Load Balancing, Reflexive Access Lists (ACLs) elements.

Hereinafter a process will be described for establishing a data communication session between network containers without performing the handshake process. This will be further described below with reference to FIG. 4.

For the functionalities, which will be described with reference to FIG. 4, the following assumptions can be taken into consideration: First, a server, physical or virtual such as physical host 302 or 304, has one virtual switch/router (vswitches 324 or 326, respectively) and has at least one IPv4 or IPv6 address. Second, a network container has at least one IPv4 or IPv6 address associated therewith. Third, when a server/physical host joins a cluster of servers/physical hosts, the joining server/physical host establishes an HTTP2 tunnel over a SSL connection to every other server in the cluster, such as tunnel 328 between physical hosts 302 and 304. Another example communication tunnel over a SSL connection is a Quick User Datagram Protocol (UDP) Internet Connection (QUIC) tunnel. While HTTP2 and QUIC are provided as example protocols for establishing communication tunnels over a SSL connection, the present disclosure is not limited thereto and any other known, or to be developed, applicable communication protocol may be used.

While FIG. 3 illustrates only two physical hosts, as the number of physical hosts increase, it is easy to see that any two physical host can be connected via a communication tunnel such as tunnel 328, thus resulting in a mesh of tunnels, each having one or more data streams embedded therein for establishing a data session between containers residing on the two corresponding physical hosts.

Figure 4:
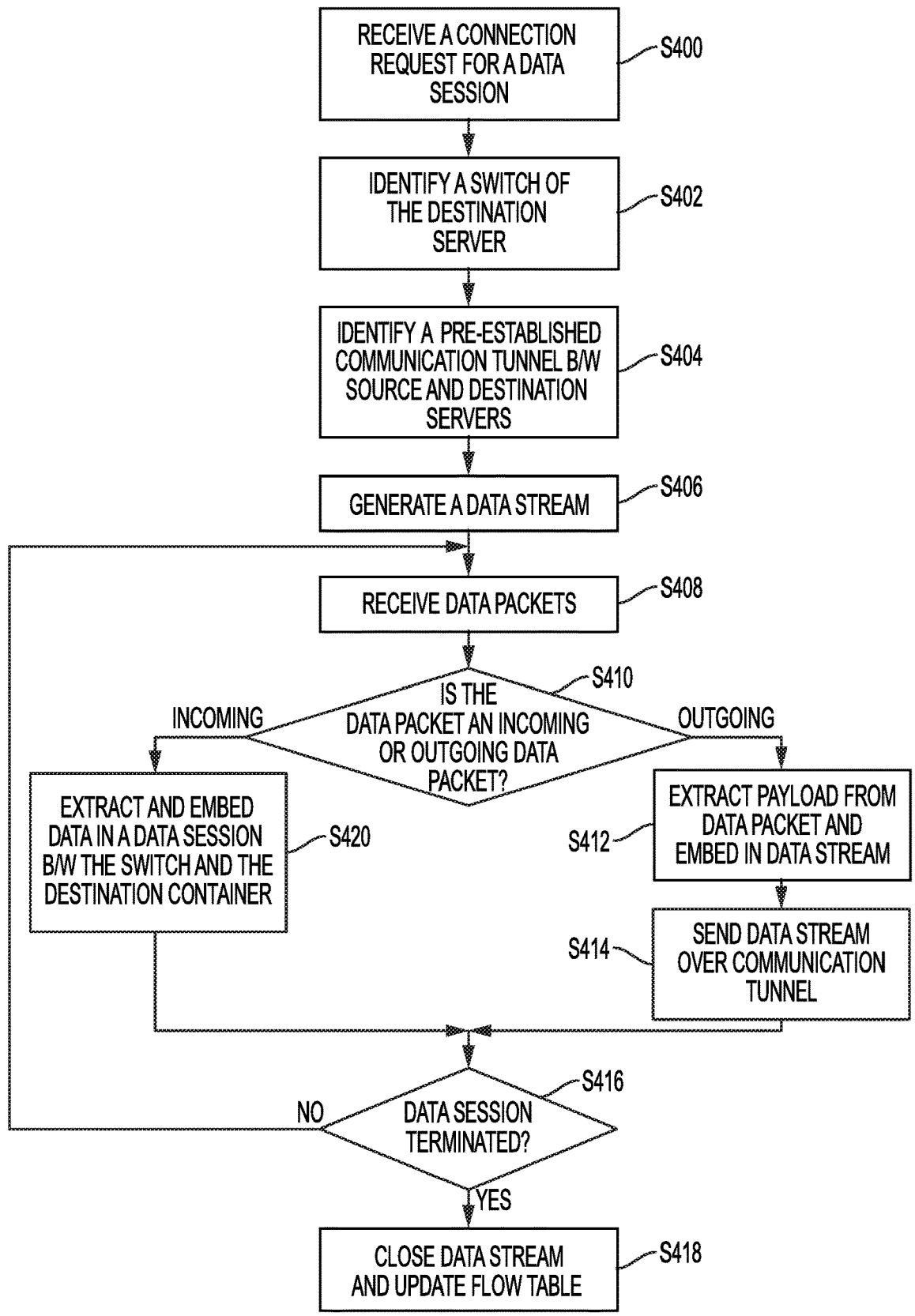
FIG. 4 is a method of container networking, according to one aspect of the present disclosure.

With the above assumptions, the disclosure now turns to FIG. 4. FIG. 4 is a method of container networking, according to some aspects of the present disclosure. FIG. 4 will be described from the perspective of switch 324 of physical host 302. However, it is readily ascertainable that the method of FIG. 4 can be implemented by switch 326 of physical host 304 or a switch of any other network connected server/physical host providing resources for running container-based services and applications. Furthermore, in describing FIG. 4, switch 324 may be referred as the source switch, switch 326 may be referred to as the destination switch, physical host 302 may be referred to as the source server and physical host 304 may be referred to as the destination server.

At S400, switch 324 receives a connection request from a first container (e.g., one of containers 310, 312, 314, 316 hosted on physical host 302) to establish a data session with a second container (e.g., container 318 hosted on physical host 304). This connection and the requested data session can also be referred to as a container-to-container connection request and a container-to-container data session. The requested data session may be a TCP session to the second container for exchanging data.

In one example, as part of the connection request, switch 324 receives a TCP synchronization (TCP SYN) packet from the first container. TCP SYN packet can include various information including, but not limited to, an IP address of container 318 (second container), which can be a virtual or actual IP address assigned to container 318. This may be referred to as the destination IP address.

In one example, if the destination IP address is a virtual IP address, switch 324 may assign an actual (physical) IP address of the destination container 318 thereto using any known or to be developed selection algorithm (e.g., cluster IP mode implemented in Kubernetes or Contiv-VPP).

In one example, and upon receiving the connection request, switch 324 can establish a TCP session between first network container, from which the connection request is received at S400 and switch 324.

At S402, switch 324 identifies a switch (a destination switch) of the destination server based on the destination IP address. Included in the TCP SYN packet. This can be switch 326 of physical host 304 in FIG. 3.

In one example, each of the source switch (e.g., switch 324) and the destination switch (e.g., switch 326) can be a virtual switch/virtual router or a physical switch/physical router.

At S404 and after identifying the destination server and destination switch at S402, switch 324 identifies a pre-established/existing communication tunnel between the source and destination servers (e.g., the HTTP2 tunnel 328 of FIG. 3 established between physical host 302 and physical host 304).

At S406, switch 324 generates a data stream to be embedded in the communication tunnel for communicating data packets (e.g., TCP data packets) received from the source container to be sent to the destination. The data stream may be an HTTP2 stream in the HTTP2 tunnel. In one example, switch 324 generates the HTTP2 stream by creating a packet using a ":connect" method in a header field of the packet and including the destination IP address and ports (e.g., virtual ports connection Contiv HostAgent 306 to the source container (e.g., one of containers 310, 312, 314, 316), which can be extracted from the TCP SYN packet.

In another example and when a QUIC stream in a QUIC tunnel is used instead of HTTP2, appropriate QUIC headers and methods may be utilized to generate the data stream.

Accordingly, the communication protocol used by the data stream for sending and receiving data between physical hosts 302 and 304 is different from the communication protocol originally requested by the source container at S400 (e.g., HTTP2 v. TCP).

In one example, switch 324 (the source switch) has a flow table created for mapping 5-tuple of container to container TCP connection requested at S400 to an identifier of the HTTP2 stream.

Having established the HTTP2 stream, at S408, switch 324 receives data packets from the source container (e.g., one of containers 310, 312, 314, 316).

In one example, at S408, the data packet received by switch 324 can be an outgoing TCP data packet originating from the source container and destined for the destination container, as described above. In the alternative, the data packet received by switch 324 at S408 can be an incoming HTTP2 Data (or alternatively, QUIC data), which was originally sent by another container (e.g., container 318) hosted on a different server (e.g., physical host 304) as a TCP data packet but converted and transmitted by the switch (e.g., switch 326) of the different server into HTTP2 data before transmission thereof to switch 324 and ultimately to the target container (e.g., one of containers 310, 312, 314, 316 hosted on physical host 302).

Therefore, at S410, switch 324 determines if a received data packet is an outgoing packet or an incoming packet. If at S410, switch 324 determines that the packet is an outgoing TCP data packet, then at S412, switch 324 extracts the payload of the TCP data packet received at S408 and embeds the same into data packets portion of the HTTP2 stream.

In one example and at any given point, switch 324 may have multiple HTTP2 sessions created, all of which can be multiplexed onto the HTTP2 tunnel destined for the destination server and containers hosted thereon. Therefore, using the flow table, switch 324 can manage the incoming/outgoing data packets and map them to the correct HTTP2 streams.

Thereafter, at S414, switch 324 sends the HTTP2 stream over the HTTP2 tunnel to the destination switch (e.g., switch 326). By using the HTTP2 session over an existing HTTP2 tunnel, the need for establishing a TCP connection between the source and destination containers and the underlying handshake process is eliminated.

At S416, switch 324 determines if the data session (e.g., the TCP session) has been terminated. Switch 324 may determine the termination of the TCP session by receiving a notification of termination from the source container.

If at S416, switch 324 determines that the TCP session is still active/alive (NO at S416), the process reverts back to S408 and switch 324 continues to receive TCP packets. However, if at S416, switch 324 determines that the TCP session is terminated, then at S418, switch 324 closes the data stream (HTTP2 stream) and updates the flow table accordingly (e.g., removes the corresponding TCP connection-HTTP2 stream mapping entry from the flow table).

Referring back to S410, if switch 324 determines that the received packet is an incoming HTTP2 data packet, then at S420, switch 324 extracts the data from the received HTTP2 data packet and embeds the same into an existing TCP data packet to be sent to the target container (e.g., one of containers 310, 312, 314, 316) for which a TCP session with switch 324 is active. Thereafter, the process reverts back to S416 and S416 and S418 are repeated.

The process of FIG. 4 can provide the following advantages. First, the number of active and open TCP sessions grows with the square of the number of servers/physical hosts in a cluster of connected servers and not the square of the number of containers (there can be multiple containers on a single physical host). Given that containers are spawned very frequently to provide services, persistent connections between the containers are no longer needed but instead existing persistent connection between their physical hosts to create "as-needed" container-to-container connections as streams embedded in an HTTP2 tunnel between physical hosts.

Second, connections between source and destination containers are no longer visible at the physical infrastructure since they are tunneled through HTTP2 streams established on-demand. Furthermore, TCP connections between containers and hence the network resource consuming handshake process thereof are also eliminated, which reduces the number of flows in the network Fabric generated as a result of the large number of containers that implement highly meshed applications The disclosure now turns to FIG. 5, which illustrates an example device. These example device can function as any one of network components such as physical host 302 and/or 304 of FIG. 3 to enable instantiation of containers that in turn provide service functions to end client devices and perform the above described method of FIG. 4.

Figure 5:
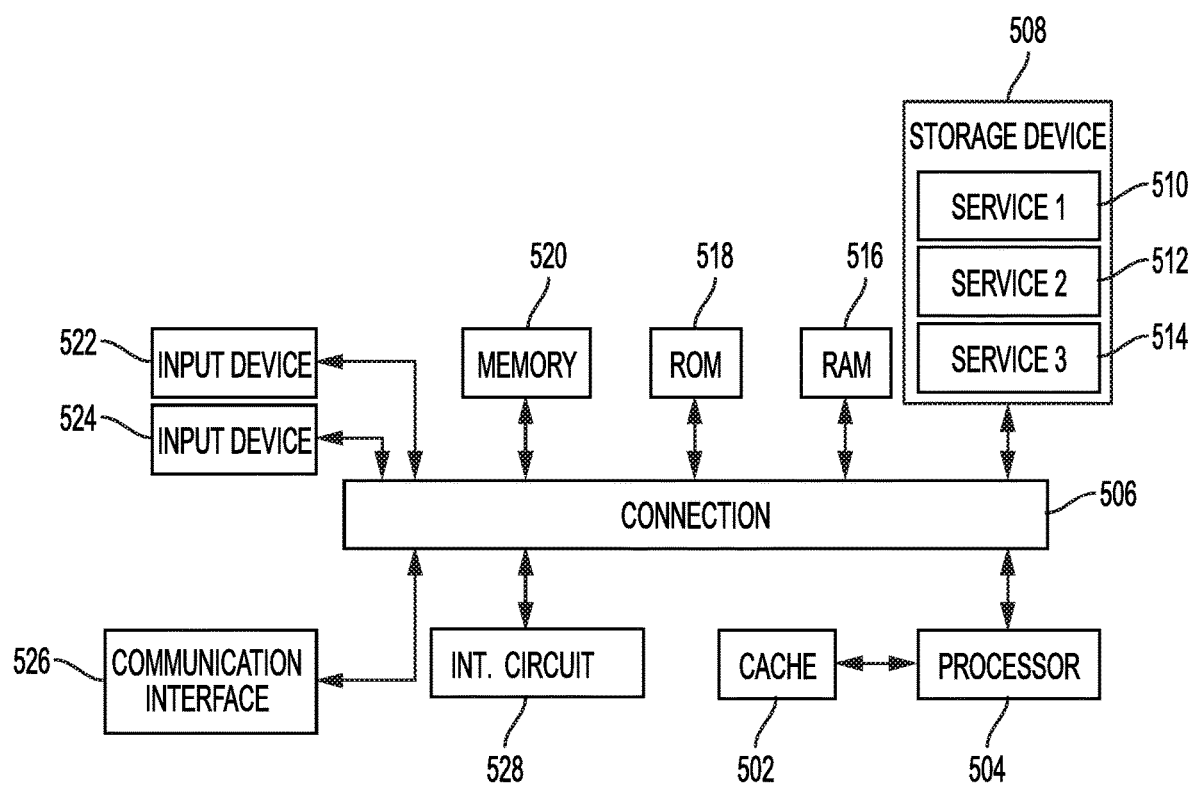
FIG. 5 illustrates an example system including various hardware computing components, according to an aspect of the present disclosure.

FIG. 5 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 5 illustrates a system bus computing system architecture 500 wherein the components of the system are in electrical communication with each other using a connection 506. Exemplary system 500 includes a processing unit (CPU or processor) 504 and a system connection 506 that couples various system components including the system memory 520, such as read only memory (ROM) 518 and random access memory (RAM) 516, to the processor 504. The system 500 can include a cache of high-speed memory connected directly with, in close proximity to, or integrated as part of the processor 504. The system 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general purpose processor and a service component, such as service 1 510, service 2 512, and service 3 514 stored in storage device 508, configured to control the processor 504 as well as a special-purpose processor where software instructions are incorporated into the actual processor design. The processor 504 may essentially be a completely self-contained computing system, containing multiple cores or processors, a bus, memory controller, cache, etc. A multi-core processor may be symmetric or asymmetric.

To enable user interaction with the computing device 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing device 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The system 500 can include an integrated circuit 528, such as an application-specific integrated circuit (ASIC) configured to perform various operations. The integrated circuit 528 can be coupled with the connection 506 in order to communicate with other components in the system 500.

The storage device 508 can include software services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    receiving, at a source switch, a request from a first network container on a source server to establish a data session with a second network container on a destination server;
    identifying, by the source switch, a pre-established communication tunnel between the source server and the destination server;
    generating, by the source switch, a data stream to be embedded in the pre-established communication tunnel, wherein a communication protocol associated with the request is different from a communication protocol used by the data stream for communicating data between the first network container and the second network container;
    receiving a data packet, at the source switch, to be sent to the destination server;
    mapping, by the source switch, the data packet to the data stream; and
    sending, by the source switch, the data packet to the destination server via the data stream over the communication tunnel.

2. The method of claim 1, wherein the data session requested by the first network container is a transmission control protocol (TCP) session.

3. The method of claim 2, further comprising:
    determining, by the source switch, a destination switch of the destination server based on the request, wherein determining the destination switch is based on an IP address included in a TCP SYN packet received as part of the request.

4. The method of claim 2, wherein mapping the data packet to the data stream is based on a flow table that maps a 5-tuple of the TCP session to the data stream.

5. The method of claim 1, wherein
    the communication tunnel is a Hyper Text Transfer Protocol 2 (HTTP2) tunnel and the data stream is an HTTP2 stream; or
    the communication tunnel is a Quick UDP Internet Connection (QUIC) tunnel and the data stream is a QUIC stream; and
    the communication tunnel is part of a mesh of communication tunnels between a pair of servers, each communication tunnel being configured to have at least one data stream embedded therein for enabling communication between two network containers on a corresponding pair of servers.

6. The method of claim 1, wherein mapping the data packet to the data stream comprises:
    extracting payload of the data packet to yield extracted payload; and
    embedding the extracted payload into a data field of the data stream.

7. The method of claim 1, further comprising:
    determining whether the data session has been terminated or not; and
    in response to determining that the data session has been terminated, closing the data stream and updating a corresponding flow table for maintaining mapping of one or more data sessions to one or more data streams.

8. A device comprising:
    one or more network containers implemented thereon; and
    a network switch configured to:
        receive a request from a first network container of the one or more network containers on the server to establish a data session with a second network container on a destination server;
        identify a communication tunnel between the server and the destination server;
        generate a data stream to be embedded in the communication tunnel for exchange of data packets between the first network container and the second network container, wherein a communication protocol associated with the request received from the first network container is different from a communication protocol used by the data stream for facilitating the exchange of data packets between the first network container and the second network container;
        receive a data packet from the first network container to be sent to the destination server;
        map the data packet to the data stream; and
        send the data packet to the destination server via the data stream over the communication tunnel.

9. The device of claim 8, wherein the switch is a virtual switch.

10. The device of claim 8, wherein the data session requested by the first network container is a transmission control protocol (TCP) session.

11. The device of claim 10, wherein the switch is configured to determine the destination switch based on an IP address included in a TCP SYN packet received as part of the request.

12. The device of claim 10, wherein the switch is configured to map the data packet to the data stream based on a flow table that maps a 5-tuple of the TCP session to the data stream.

13. The device of claim 8, wherein
    the communication tunnel is a Hyper Text Transfer Protocol 2 (HTTP2) tunnel and the data stream is an HTTP2 stream; or the communication tunnel is a Quick UDP Internet Connection (QUIC) tunnel and the data stream is a QUIC stream; and the communication tunnel is part of a mesh of communication tunnels between a pair of servers, each communication tunnel being configured to have at least one data stream embedded therein for enabling communication between two network containers on a corresponding pair of servers.

14. The device of claim 8, wherein the switch is configured to map the data packet to the data stream by:

extracting payload of the data packet to yield extracted payload; and embedding the extracted payload into a data field of the data stream.

15. The device of claim 8, wherein the switch is further configured to:

determine whether the data session has been terminated or not; and in response to determining that the data session has been terminated, close the data stream and update a corresponding flow table for maintaining mapping of one or more data sessions to one or more data streams.

16. The device of claim 8, wherein multiple data streams are multiplexed onto the communication tunnel for carrying data packets to the destination server.

17. One or more non-transitory computer-readable medium having computer-readable instructions stored therein, which when executed by one or more processors, cause the one or more processors to function as a virtual switch of a server to:

receive a request from a first network container on the server to establish a transfer control protocol (TCP) session with a second network container on a destination server;

identify a communication tunnel between the server and the destination server;

generate a data stream to be embedded in the communication tunnel for exchange of data packets between the first network container and the second network container, wherein a communication used by the data stream for facilitating the exchange of data packets between the first network container and the second network container is different from a TCP protocol used for the TCP session;

receive a TCP data packet from the first network container to be sent to the destination container;

map the TCP data packet to the data stream; and transmit the TCP data packet to the destination server via the data stream over the communication tunnel.

18. The one or more non-transitory computer-readable medium of claim 17, wherein the virtual switch is configured to map the TCP data packet to the data stream based on a flow table that maps a 5-tuple of the TCP session to the data stream.

19. The one or more non-transitory computer-readable medium of claim 17, wherein the communication tunnel is a Hyper Text Transfer Protocol 2 (HTTP2) tunnel and the data stream is an HTTP2 stream; or the communication tunnel is a Quick UDP Internet Connection (QUIC) tunnel and the data stream is a QUIC stream; and the communication tunnel is part of a mesh of communication tunnels between a pair of servers, each communication tunnel being configured to have at least one data stream embedded therein for enabling communication between two network containers on a corresponding pair of servers.

20. The one or more non-transitory computer-readable medium of claim 17, wherein the virtual switch is configured to:

determine whether the data session has been terminated or not; and in response to determining that the data session has been terminated, close the data stream and update a corresponding flow table for maintaining mapping of one or more data sessions to one or more data streams.

\* \* \* \* \*